(12) United States Patent
Guo et al.

(10) Patent No.: US 8,528,165 B2
(45) Date of Patent: Sep. 10, 2013

(54) SPRAY CENTRIFUGAL DEDUSTING FAN

(76) Inventors: Feng Guo, Shandong (CN); Tian Li, Shandong (CN)

(*) Notice: Subject to any disclaimer, the term of this patent is extended or adjusted under 35 U.S.C. 154(b) by 325 days.

(21) Appl. No.: 13/124,836

(22) PCT Filed: Oct. 8, 2010

(86) PCT No.: PCT/CN2010/001569
§ 371 (c)(1),
(2), (4) Date: Apr. 18, 2011

(87) PCT Pub. No.: WO2011/120208
PCT Pub. Date: Oct. 6, 2011

(65) Prior Publication Data
US 2011/0277271 A1    Nov. 17, 2011

(30) Foreign Application Priority Data
Mar. 31, 2010    (CN) .......................... 2010 1 0137099

(51) Int. Cl.
*B08B 5/02*    (2006.01)
(52) U.S. Cl.
USPC ............................................... 15/405; 261/90
(58) Field of Classification Search
USPC ................. 15/302, 405; 261/80–90; 96/282, 96/306, DIG. 54
See application file for complete search history.

(56) References Cited

U.S. PATENT DOCUMENTS 3,596,885 A * 8/1971 Stone ............................. 261/84
3,804,383 A * 4/1974 van Diepenbroek ............ 261/30

FOREIGN PATENT DOCUMENTS
WO PCT/CN2010/001569    1/2011

* cited by examiner

*Primary Examiner* — Dung Van Nguyen
(74) *Attorney, Agent, or Firm* — Global IP Services; Tianhua Gu

(57) ABSTRACT

The invention provides a spray centrifugal dedusting fan, including an air cylinder consisting of a spray cylinder, a centrifugal cylinder and a fan cylinder; the left end and the right end of the air cylinder are respectively provided with an air inlet and an air outlet communicated with each other; a spraying device is installed in the spray cylinder; a plurality of through holes are arranged on the wall of the centrifugal cylinder; a bracket is installed inside the centrifugal cylinder; at least one centrifugal impeller is installed on the bracket; a fan is installed inside the fan cylinder; an outer cylinder is installed on the external wall of the centrifugal cylinder 11; an empty chamber is arranged between the centrifugal cylinder and the outer cylinder; the lower end of the outer cylinder is connected with a water seal elbow; the water seal elbow is communicated with the empty chamber, the trumpet-shaped first water-blocking shield is connected to the right part inside the centrifugal cylinder; the left port diameter of the first water-blocking shield is smaller than the right port in diameter; the left port of the first water-blocking shield corresponds to the centrifugal impeller and the right port corresponds to the fan. The invention adopts the spray centrifugal form to remove dust in air, which solves the problems of great air circulation resistance, low dedusting efficiency, high energy consumption and easy breakage of fan motor etc. in the prior art.

4 Claims, 2 Drawing Sheets

SPRAY CENTRIFUGAL DEDUSTING FAN

CROSS REFERENCE TO RELATED PATENT APPLICATION

The present application is the US national stage of PCT/CN2010/001569 filed on Oct. 8, 2010, which claims the priority of the Chinese patent application No. 201010137099.1 filed on Mar. 31, 2010, which application is incorporated herein by reference.

FIELD OF THE INVENTION

This invention relates to the technical field of dedusting equipment, more particularly, to a spray centrifugal dedusting fan that is used in mine wells to remove dust in the air of the operation environment.

BACKGROUND OF THE INVENTION

At present, on the sites with serious dust pollution such as operating mine wells and tunnel construction, filter-type de-dusting devices are commonly used to remove dust in the air through circulating and filtering, so as to purify the air on such working and construction sites and protect the workers' health. The de-dusting device removes dust in the air using filter with very tiny meshes. However, the filter may absorb more and more dust when in use and thus increasing the air circulation resistance, resulting in increasing load of the fan motor, which not only wastes energy but also decrease the de-dusting efficiency, and the fan motor becomes more liable to breakage due to constantly increasing current. All these bring much troubles.

SUMMARY OF THE INVENTION

The invention provides a spray centrifugal dedusting fan, which removes dust in the air in a spray centrifugal form. The invention solves the problems of great air circulation resistance, low dedusting efficiency, high energy consumption and easy breakage of fan motor etc. in the prior art.

The aim of the invention is realized through the following technical proposal: a spray centrifugal dedusting fan, including an air cylinder that consists of a spraying cylinder, a centrifugal cylinder and a fan cylinder; the right end and the left end of the air cylinder respectively have an air outlet and an air inlet communicated with each other; a spraying device is installed in the spraying cylinder; a plurality of through holes are arranged on the wall of the centrifugal cylinder; a bracket is installed inside the centrifugal cylinder; at least one centrifugal impeller is installed on the bracket; a fan installed is installed inside the fan cylinder; the fan consists of a motor and an impeller; the external wall of the centrifugal cylinder has an outer cylinder; an empty chamber is arranged between the centrifugal cylinder and the outer cylinder; the lower end of the outer cylinder is connected to a water seal elbow; the water seal elbow is communicated with the empty chamber, the trumpet-shaped first water-blocking shield is connected to the right part inside the centrifugal cylinder; the diameter of the left port of the first water-blocking shield is smaller than that of the right port; the left port of the first water-blocking shield corresponds to the centrifugal impeller and the right port corresponds to the fan; a protective shell 25 with a heat radiation port 25a is connected to the inside of the fan cylinder 21; the motor is installed in the protective shell; the impeller is arranged on the outer left side of the protective shell and corresponds to the right port of the first water-blocking shield; the circumferential diameter of the protective shell is equal to hub diameter of the impeller and the left port diameter of the first water-blocking shield.

To further realize the aim of the invention, the following technical proposal can be adopted: the right part inside the fan cylinder is connected to the second water-blocking shield; the second water-blocking shielded is trumpet-shaped; the left port of the second water-blocking shield corresponds to the fan and the right port corresponds to the air outlet. The circumferential diameter of the protective shell is equal to the hub diameter of the impeller, the left port diameter of the first water-blocking shield and the left port diameter of the second water-blocking shield. The bottom of the fan cylinder has a groove, and the discharge pipe is connected and communicated with the groove.

Beneficial effects that the invention can provide: the external wall of the centrifugal cylinder is connected to the external cylinder; an empty chamber is arranged between the centrifugal cylinder and the external cylinder, where waste water can be discharged together, thus avoiding the pollution of the parts on right part of the dedusting fan, and reducing the maintenance and prolonging service life of the dedusting fan. The trumpet-shaped first water-blocking shield is connected to the rear part inside the centrifugal cylinder; the left port diameter of the first water-blocking shield is smaller than the right port diameter; the left port of the first water-blocking shield corresponds to the centrifugal impeller and the right port corresponds to the fan. Therefore, the first water-blocking shield may prevent water from being carried away by air during the centrifugal process. This effectively avoids high moisture in discharged air, and ensures air dry after dedusting.

The lower end of the external cylinder is connected to a water seal elbow that is communicated with the empty chamber; when the fan is in use, it is hard for common discharge pipe to discharge waste water since the centrifugal cylinder is under negative pressure, and the water seal elbow can effectively seal the air flow produced by the negative pressure with the accumulated water in the return water bend, so as to ensure the discharge of waste water in the empty chamber will not be affected.

The rear part of the fan cylinder is connected to the second water-blocking shield, which is the same with the first water-blocking shield in structure, and the left port of the second water-blocking shield corresponds to the fan while the right port corresponds to the air outlet, so the second water-blocking shield can further prevent water to be carried away by air during the centrifugal process, thus avoiding high moisture in discharged air and further ensuring air dry after dedusting.

The circumferential part of the protective shell equal to hub diameter of the impeller and the left port diameter of the first and the second water-blocking shields; therefore, thus greatly reducing the resistance of following air in the dedusting fan, while saving electrical energy, promoting separating effect and further improving the dedusting efficiency.

The bottom of the fan cylinder has a groove; the discharge pipe is connected to and communicated with the groove, and can collect water drops in the fan cylinder to the groove and then discharges the accumulated water, ensuring a dry fan cylinder.

The invention removes dust with a centrifugal structure. So it is of stable power, and the motor will not be easily burned.

DETAILED DESCRIPTIONS OF THE INVENTION

Figure 1:
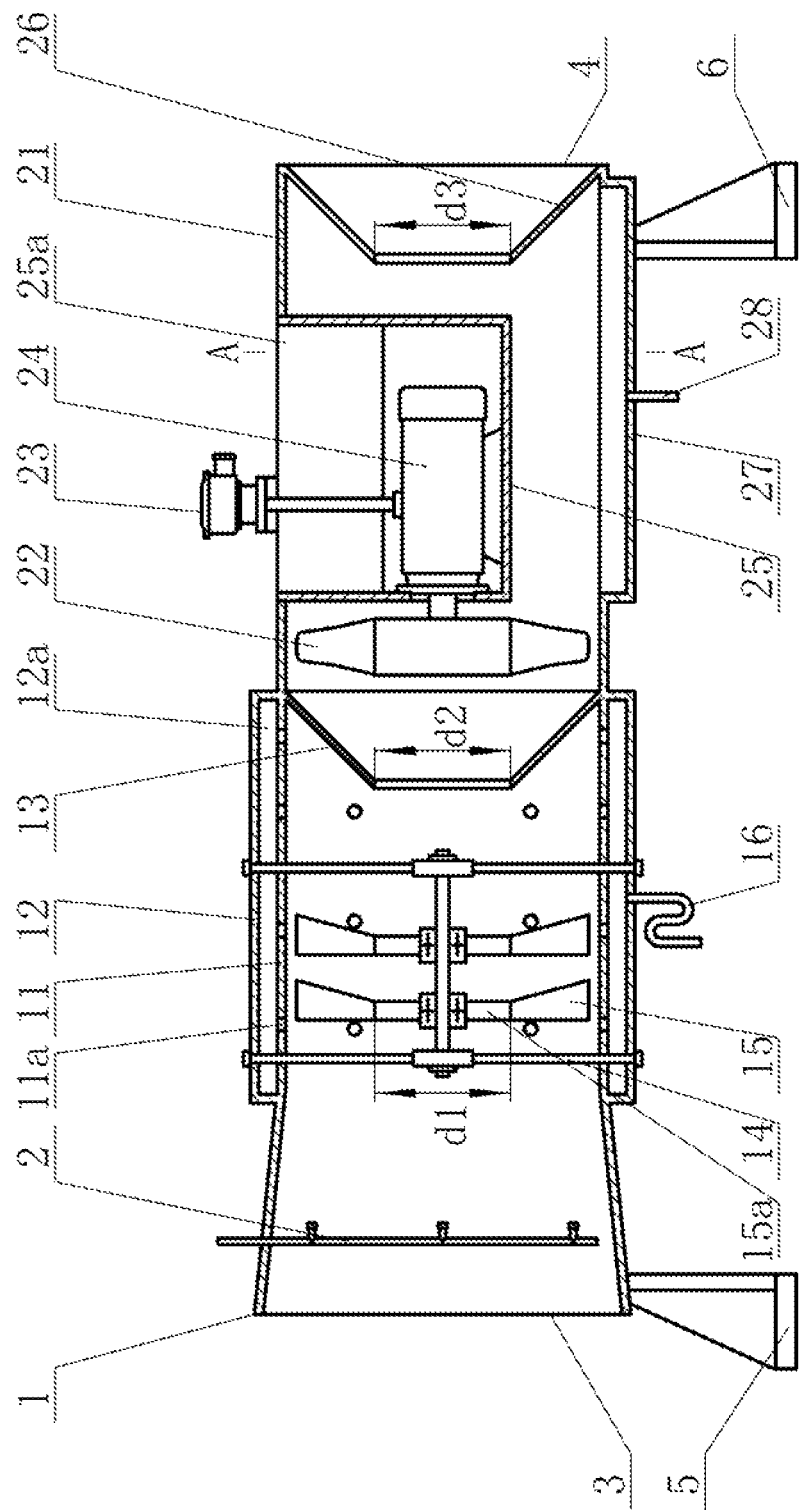
FIG. 1 is in the structural drawing of the invention.
Figure 2:
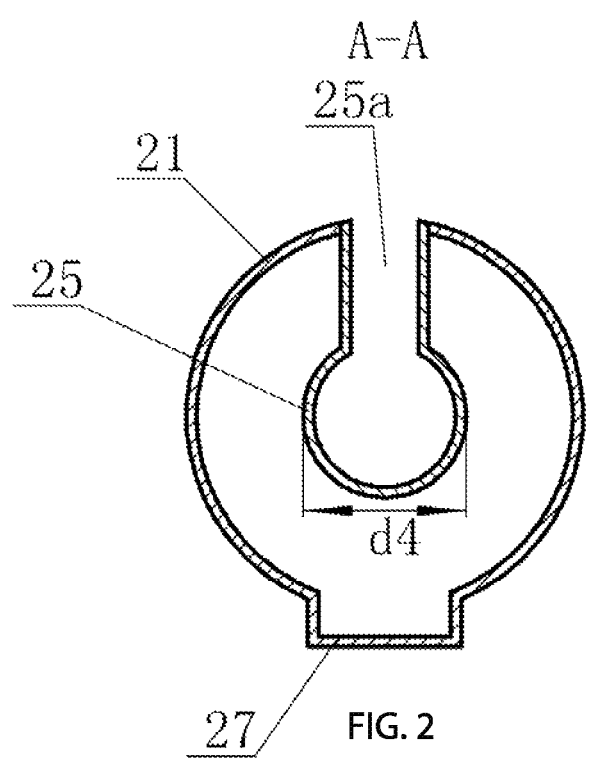
FIG. 2 is the structural drawing of A-A section in FIG. 1.

The left and right positions of the structure of this invention indicate the positions in FIG. 1. The spray centrifugal dedusting fan of the invention is in horizontal structure, with a holder set at the bottom. It shall be installed in laneway for use.

The spray centrifugal dedusting fan of the invention includes a spraying cylinder 1, a centrifugal cylinder 11 and a fan cylinder 21, which are mutually connected to form an air cylinder, and the right and left ends of the air cylinder has an air inlet 3 and air outlet 4 communicated with each other; a spraying device 2 is installed inside the spraying cylinder 1; a plurality of holes 11a are arranged on the wall of the centrifugal cylinder 11; a bracket 14 is installed inside the centrifugal cylinder 11; at least one centrifugal impeller 15 is installed on the bracket 14; the fan is installed inside the fan cylinder 21; the fan consists of a motor 24 and an impeller 22; an outer cylinder 12 is installed on the external wall of the centrifugal cylinder 11; an empty chamber 12a is arranged between the centrifugal cylinder 11 and the outer cylinder 12; the lower end of the outer cylinder 12 is connected to a water seal elbow 16; the water seal elbow 16 is communicated with the empty chamber 12a, and the trumpet-shaped first water-blocking shield 13 is connected to the right part inside the centrifugal cylinder 11; the left port diameter of the first water-blocking shield 13 is smaller than the right port diameter; the left port of the first water-blocking shield 13 corresponds to the centrifugal impeller 15 while the right port corresponds to the fan; a protective shell 25 with a heat radiation port 25a is connected to the inside of the fan cylinder 21; the motor 24 is installed inside the protective shell 25; the impeller 22 is arranged on the outer left side and corresponds to the right port of the first water-blocking shield 13; the circumferential diameter d4 of the protective shell 25 is equal to the hub diameter d1 of the impeller 15 and the left port diameter d2 of the first water-blocking shield 13.

The right part inside the fan cylinder 21 is connected to the second water-blocking shield 26; the second water-blocking shield 26 is trumpet-shaped, the left port of the second water-blocking shield corresponds to the fan while the right port corresponds to the air outlet 4. The circumferential diameter of the protective shell 25 is equal to the hub diameter d1 of the impeller 15, the left port diameter d2 of the first water-blocking shield 13 and the left port diameter d2 of the second water-blocking shield 26. The bottom of the fan cylinder 21 is connected to the discharge pipe 28; the bottom of the fan cylinder has a groove 27; and the discharge pipe 28 is connected and communicated with the groove 27.

The spray centrifugal dedusting fan can be manufactured by assembling the parts fabricated according to the above-mentioned structure.

During operation, the motor 24 inside the fan cylinder 21 rotates the impeller 22, and the spray cylinder 1 and the centrifugal cylinder 11 are under negative pressure, while the fan cylinder 21 is under positive pressure; start the spray device 2, the centrifugal impeller 15 can automatically rotate with the rotation function of the impeller 22; the centrifugal impeller consists of two rows. At this time, dust-borne air enters the fan cylinder from the air inlet 3 and mixes with water mist under the function of the centrifugal impeller 15, forming dust-borne water drops, which are cast away to the wall of the centrifugal cylinder 11; then the water drops enter the empty chamber 12a through the through holes 11a, and are discharged through the water seal elbow 16.

The first water-blocking shield blocks moisture in the air, avoiding the moisture entering the fan cylinder 21 and ensuring air dry after dedusting.

The water seal elbow 16 seals the air flow under negative pressure with the accumulated water in the return water bend, so as to ensure the discharge of waste water in the empty chamber 12a not affected.

The second water-blocking shield 26 further prevents moisture from being carried away by air during the centrifugal process and further ensures air dry after dedusting.

The circumferential diameter of the protective shell 25 is equal to the hub diameter of the impeller 15 and the left port diameter of the first water-blocking shield 13 and the left port diameter second water-blocking shield 26; thus greatly reducing the air flowing resistance in the dedusting fan, saving electrical energy, and improving the dedusting efficiency.

The bottom of the fan cylinder 21 has a groove 27; the discharge pipe 28 is connected to and communicated with the groove 27, it can collect water drops in the fan cylinder 21 to the groove 27 and then discharge the accumulated water through the discharge pipe 28, ensuring a dry fan cylinder 21.

A junction box 23 is arranged on the upper part of the fan cylinder 21; the leading wire at the lower part of the junction box 23 is arranged in the heat radiation port 25a and connected to the motor 24, which is a known technical solution.

The inside of the centrifugal cylinder 11 is connected with the bracket 14, and at least one impeller 15 is installed on the bracket 14, which is a known technical solution.

The spray device 2 is connected to a water source, which is a known technical solution.

The technical proposal of invention includes but is not limited to the embodiment herein, and other embodiments can also be utilized to complete the technical proposal.

The technology, shape and structure not described in detail by the invention are all known technical solutions.

In FIG. 1, 5 is the front holder and 6 is the rear holder.

What is claimed is:

1. A spray centrifugal dedusting fan, comprising:
    an air cylinder including a spray cylinder, a centrifugal cylinder and a fan cylinder which are connected with each other, and an air outlet and an air inlet connected with a left end a right end of the air cylinder respectively;
    the spray cylinder has a spray device installed therein;
    the centrifugal cylinder has a plurality of through holes arranged on wall thereof, a bracket is installed inside the centrifugal cylinder, at least one centrifugal impeller is installed on the bracket;
    the fan cylinder has a fan installed therein, the fan consists of a motor and an impeller;
    an outer cylinder is installed outside the external wall of the centrifugal cylinder, an empty chamber is arranged between the centrifugal cylinder and the outer cylinder, a lower end of the outer cylinder is connected to a water seal elbow which is communicated with the empty chamber, a trumpet-shaped first water-blocking shield is fixed at a right end inside the centrifugal cylinder, a diameter of a left port of the first water-blocking shield is smaller than that of the right port, the left port of the first water-blocking shield corresponds to the centrifugal impeller and the right port corresponds to the fan;
    the fan cylinder has a protective shell with a heat radiation port, a motor is installed inside the protective shell, the fan is arranged at outside the protective shell and corresponds to the right port of the first water-blocking shield, a circumferential diameter (d4) of the protective shell is equal to the hub diameter (d1) of the fan and a left port diameter (d2) of the first water-blocking shield.

2. The spray centrifugal dedusting fan of claim 1, wherein a inner right part of the fan cylinder is connected to a second water-blocking shield which is trumpet-shaped; and the left port of the second water-blocking shield is corresponds to the fan, while the right port corresponds to the air outlet.

3. The spray centrifugal dedusting fan of claim 2, wherein the circumferential diameter (d4) of the protective shell is equal to the hub diameter (d1) of the impeller, the left port diameter (d2) of the first water-blocking shield and the left port diameter (d3) of the second water-blocking shield.

4. The spray centrifugal dedusting fan of claim 1, wherein the bottom of the fan cylinder is connected to a discharge pipe; the inner bottom of the fan cylinder has a groove, and the discharge pipe is connected and communicated with the groove.

* * * * *